US009910678B1

(12) United States Patent
Furyaev et al.

(10) Patent No.: US 9,910,678 B1
(45) Date of Patent: Mar. 6, 2018

(54) NETBOOT FOR INSTALLATION OF A NON-NATIVE OS ON A TARGET HOST

(71) Applicant: Parallels IP Holdings GmbH, Schaffhausen (CH)

(72) Inventors: Timofey Furyaev, Moscow (RU); Nikolay N. Dobrovolskiy, Moscow (RU); Evgeny Smirnov, Moscow (RU)

(73) Assignee: Parallels IP Holdings GmbH, Schaffhausen (CH)

( * ) Notice: Subject to any disclaimer, the term of this patent is extended or adjusted under 35 U.S.C. 154(b) by 245 days.

(21) Appl. No.: 14/695,468

(22) Filed: Apr. 24, 2015

(51) Int. Cl.
| | | |
|---|---|---|
| *G06F 15/16* | (2006.01) | |
| *G06F 9/44* | (2018.01) | |
| *G06F 3/06* | (2006.01) | |
| *H04L 12/42* | (2006.01) | |
| *G06F 9/445* | (2018.01) | |
| *G06F 9/50* | (2006.01) | |

(52) U.S. Cl.
CPC .......... *G06F 9/4416* (2013.01); *G06F 3/0607* (2013.01); *G06F 8/63* (2013.01); *G06F 9/4406* (2013.01); *G06F 9/5011* (2013.01); *H04L 12/42* (2013.01)

(58) Field of Classification Search
CPC ..... G06F 8/63; G06F 8/64; G06F 8/61; G06F 8/60; G06F 3/0607; G06F 3/0632; G06F 9/5011; G06F 9/45533; H04L 12/42
USPC .............. 713/2; 370/457; 709/226; 717/174; 710/20, 5
See application file for complete search history.

(56) References Cited

U.S. PATENT DOCUMENTS

| | | | | |
|---|---|---|---|---|
| 5,640,592 | A * | 6/1997 | Rao | G06F 3/0607 710/20 |
| 7,590,141 | B1 * | 9/2009 | Barry | H04L 12/42 370/457 |
| 7,950,010 | B2 * | 5/2011 | Goger | G06F 8/61 709/220 |
| 2006/0168581 | A1 * | 7/2006 | Goger | G06F 8/61 717/174 |
| 2007/0245135 | A1 * | 10/2007 | Dickens | G06F 8/63 713/2 |
| 2008/0046708 | A1 * | 2/2008 | Fitzgerald | G06F 8/63 713/2 |
| 2010/0192145 | A1 * | 7/2010 | Liles | G06F 8/60 717/174 |
| 2011/0055299 | A1 * | 3/2011 | Phillips | G06F 9/45533 707/827 |
| 2013/0318242 | A1 * | 11/2013 | Srinivasa | G06F 9/5011 709/226 |

(Continued)

*Primary Examiner* — Kyung H Shin
(74) *Attorney, Agent, or Firm* — Bardmesser Law Group

(57) ABSTRACT

A method for installation of a native OS on a host using non-native utilities. A native OS image is deployed on a native target client system using a non-native distribution server. The OS image is converted and packaged into a non-native format and provided to the target client. The OS image is unpacked and de-converted back to a native format and deployed on the target client. The client agent runs System Imaging Utility to acquire the OS image from the reference partition. The created OS image is pushed to the non-native file sharing system, and then the SCCM Proxy is asked to create an OS image package and a task sequence in the SCCM for this package. When the OS image is placed into the SCCM, the client agent reboots back to the reference partition.

19 Claims, 8 Drawing Sheets

(56) References Cited

U.S. PATENT DOCUMENTS

2014/0122666 A1* 5/2014 Malhotra .................. G06F 8/61
709/220

* cited by examiner

NETBOOT FOR INSTALLATION OF A NON-NATIVE OS ON A TARGET HOST

BACKGROUND OF THE INVENTION

Field of the Invention

This invention relates to a method for installation of a native operating system into native environment by a non-native server.

Description of the Related Art

System administrators have a need to install and deploy multiple Apple® MAC computers. Apple® suggests using a NetBoot utility and invoking NetInstall and NetRestore methods. These methods can either install MAC OS X or deploy an already existing OS X image respectively. This requires using the MAC server, Apple® hardware and software. These components are not always available. More often the system administrators have Windows® servers available, but existing solutions do not allow for installing MAC OS X on MAC computers using Windows® server, because Windows® uses Preboot Execution Environment (PXE) technology, and Apple® uses NetBoot that has different packaging format and different data transmission protocol. However, it is desired to be able to deploy MAC client using Windows® server running a NetBoot service.

Accordingly, a method for installation of a native operating system into native environment by a non-native server is desired.

SUMMARY OF THE INVENTION

Accordingly, the present invention is related to a method for installation of a native operating system into a native environment by a non-native server that substantially obviates one or more of the disadvantages of the related art.

In one embodiment, a method for installation of a native OS on a target host using non-native utilities is provided. A native OS image is deployed on a native target client system using a non-native distribution server. The OS image is converted and packaged into a non-native format and provided to the target client. The OS image is unpacked and de-converted back to a native format and deployed on the target client. The client agent runs a System Imaging Utility to acquire the OS image from the reference partition. The created OS image is pushed to the non-native file sharing system, and then the SCCM Proxy is asked to create an OS image package and a task sequence in the SCCM for this package. When the OS image is placed into the SCCM, the client agent reboots back to the reference partition.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
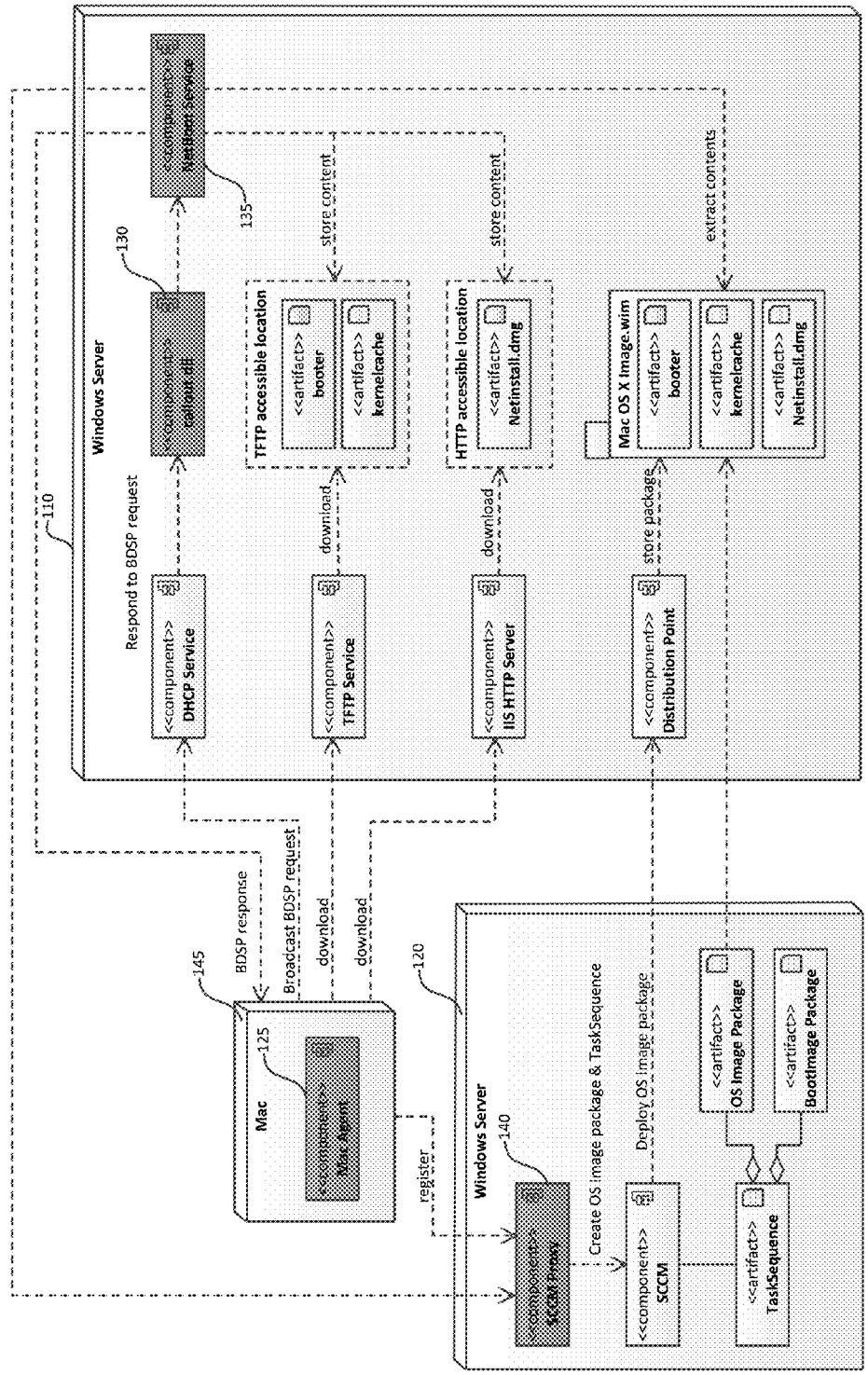
FIG. 1 illustrates a client deployment using Dynamic Host Control Protocol (DHCP) service, in accordance with the exemplary embodiment.

Reference will now be made in detail to the preferred embodiments of the present invention, examples of which are illustrated in the accompanying drawings.

The present invention is directed to a method for installation of OS X (and later) on client computers using a Windows® server. The following abbreviations are used in this disclosure. SCCM—System Center Configuration Manager, BSDP—Boot Server Discovery Protocol, WIM—Windows Imaging Format.

According to the exemplary embodiment, MAC OS X image deployment functionality provides a way to deliver OS X images over the network by utilizing native SCCM workflow and roles, including reporting functions. To deploy an OS image to a set of computers ("collection"), the OS image must be stored in SCCM as a WIM file and then added together with Boot Image (also a WIM file) to the Task Sequence that is deployed to the "collection."

A system administrator configures a MAC as the reference computer before creating a MAC OS Image. The system administrator installs the Parallels® MAC Client, which is registered in SCCM by the Parallels® Configuration Manager Proxy. The system administrator can also update existing OS components and applications or install new applications and tools.

Creation of an OS X image is implemented as follows:

The administrator reboots the reference computer into other system partition or connects it to other MACs in Target Disk Mode;

The administrator runs the System Imaging Utility to create the MAC OS Image; and The administrator saves the image into a location, where he will be able to use it in SCCM for creating a MAC OS X image WIM file.

Then, the OS X image is placed in the SCCM as follows:

The system administrator starts a dsim.exe utility from a command line to create a MAC OS X image WIM file. The system administrator enters a path to the MAC OS X image source and a path to a location where a "MAC OS X Image.wim" file is created;

Then, the system administrator adds MAC OS X Image in SCCM using the "Operating Systems" -> "Operating System Images" -> "Add Operating System Image" item;

The system administrator selects the newly created MAC OS X image item and selects the Distribute Content item from a pop-up menu to set Distribution Point for the OS image;

After the "MAC OS X Image.wim" file is copied into the Distribution Point, The system administrator runs dsim.exe utility to mount it and copy the Apple® disk image file (.dmg extension) into a folder, which is accessed by HTTP, and rest of the files into a folder, which is accessed by TFTP.

Subsequently, OS X image is assigned to a Collection of MACs as follows:

The system administrator selects the "Operating Systems" -> "Task Sequences" -> "Create Task Sequence" item, selects a boot image from the list and specifies MAC OS image;

The system administrator selects the "Devices"-> "Import Computer Information" item and adds MACs (those that are imaged) to a collection according to their Media Access Control (MAC) addresses; and After that the system administrator selects the newly created Task Sequence item and, then, he selects Deploy command from the pop-up menu and chooses the collection of MACs, to which this MAC OS X image is intended to be deployed.

According to the exemplary embodiment, the MAC OS X image is deployed to the target MACs as follows:

The system administrator starts a target MAC to deploy OS Image;

If NetBoot service proposes more than one image, the administrator selects one;

When the target MAC is ready to install the OS, the administrator confirms starting OS installation.

The next step is registering the MAC Client:

After the OS Image is deployed on a target MAC, it is rebooted automatically;

MAC Client detects the fact that MAC was imaged via network and asks SCCM Proxy for registration information;

After registration, the MAC Agent will report the registration to SCCM via SCCM Proxy.

A deployment option, in accordance with the exemplary embodiment is depicted in FIG. 1. A MAC client 145 is a target machine in which the OS X (in this example) needs to be installed. A MAC agent 125 is launched on this machine after deployment. A MICROSOFT® Server 120 is a main site server in the SCCM infrastructure. This server is connected to a MICROSOFT® Server 110 acting as a distribution point. The SCCM proxy 140 serves as an entry point of the site server 120. Note that one site server 120 can work with multiple distribution points (servers) 110. The NetBoot service 135 is invoked by a callout.dll component 130.

Then, the NetBoot service 135 communicates with SCCM proxy 140, which redirects the NetBoot service call and the NetBoot service 135 acquires OS image package and BootImage package for deployment to MAC client 145. The non-native OS image package and BootImage package are encapsulated in special containers. Thus, the NetBoot service 135 is advantageously used by MICROSOFT® Windows® Servers for deploying MAC OS X on the MAC client 145. The Apple® distribution packages are adopted for use by MS Servers in order to be used with MAC NetBoot service.

Figure 2:
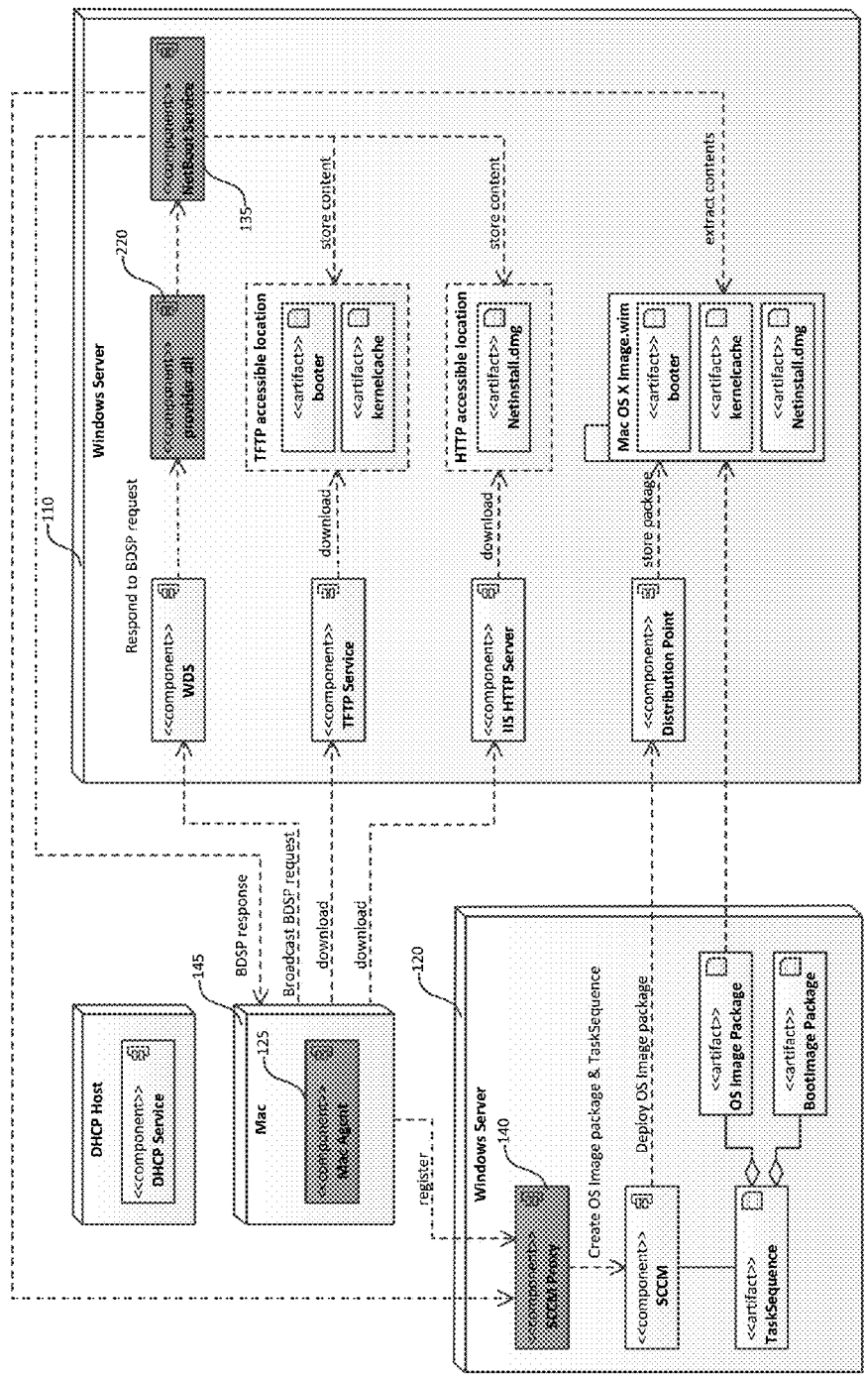
FIG. 2 illustrates a client deployment using Windows Distribution Services (WDS), in accordance with the exemplary embodiment.

This implementation uses a plug-in to Dynamic Host Control Protocol (DHCP) Server in order to pass an Apple® BSDP (Boot Server Discovery Protocol) request from a target MAC client to the NetBoot Service component 135. The plug-in is implemented using the callout.dll 130. FIG. 2 illustrates another embodiment, which uses Windows Distribution Services (WDS) instead for passing the Apple® BSDP request to the NetBoot Service component 135. The plug-in is provided by the provider.dll 220. In both implementations the Boot Image is converted from a non-native to the host server format (i.e., Apple® format) to a native format (i.e., MICROSOFT® format) readable by the SCCM and de-converted prior to deployment on the target MAC client.

According to another exemplary embodiment, an intermediate network Boot Image is launched on the MAC client 145. Then, a special application is started on the MAC client in order to show the MAC user different OS X options (versions and configurations defined by a Task Sequence) available to this user. After the user is authenticated by the UI he selects a desired option, and the MAC client 145 is automatically reloaded into the selected OS using the Task Sequence—i.e., the MAC client 145 is deployed based on the parameters defined by the SCCM Task Sequence. The UI renders to the MAC user a list of the Task Sequences configured by the administrator.

Figure 3:
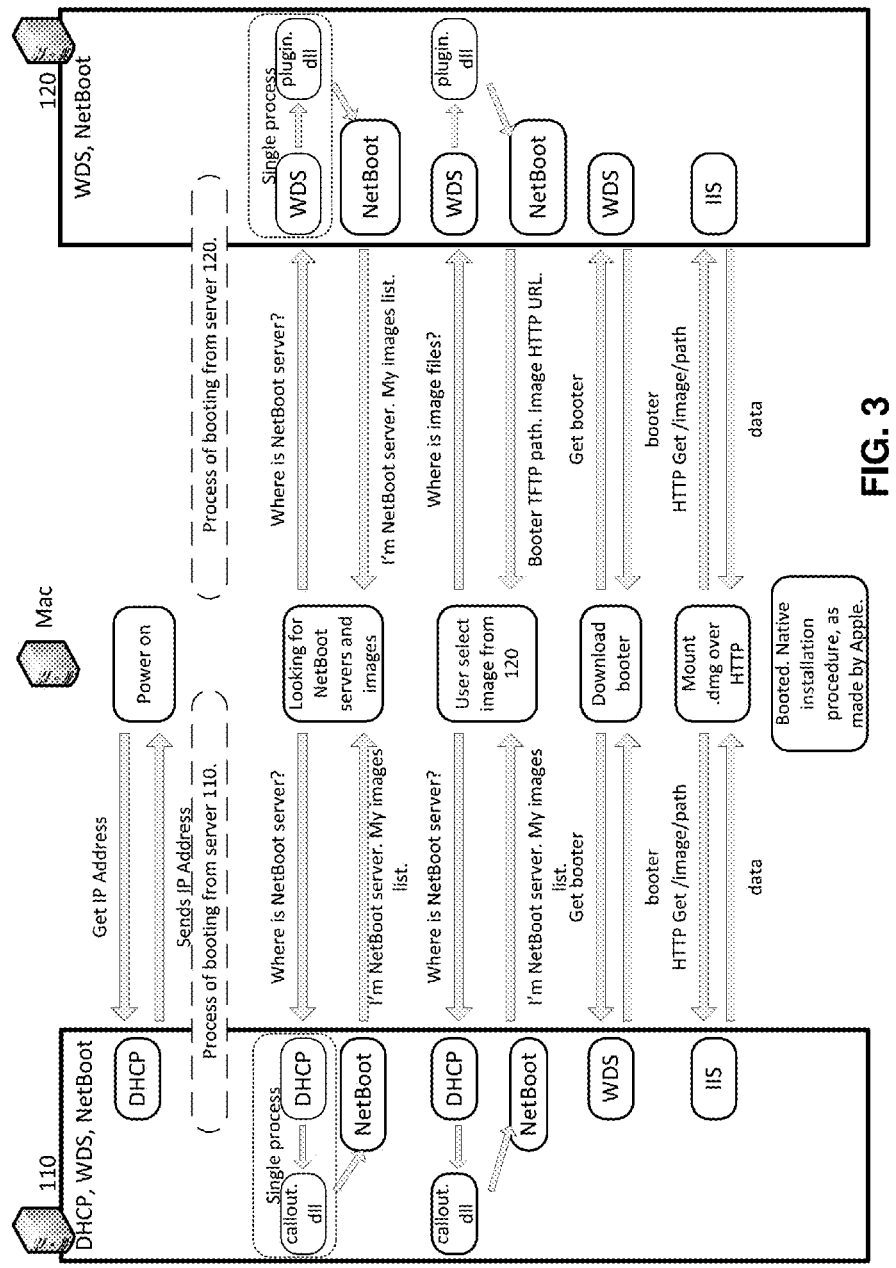
FIG. 3 illustrates how DHCP, WDS and NetBoot can be used for booting process, in accordance with the exemplary embodiment.

FIG. 3 illustrates how DHCP, WDS and NetBoot can be used for booting process.

Server 110 has DHCP, WDS and NetBoot services. Server 120 has WDS and NetBoot services installed and DHCP is installed on another network server. The callout.dll and plugin.dll (Dynamic Link Library) are registered in either DHCP service or in WDS service. These ".dlls" allow for receiving BSDP requests from MACs. The services DHCP and WDS listen for UDP packets at port 67. This port is standard for DHCP service. It is also used for loading packets over PXE and BSDP protocols.

Therefore, this port is occupied by DHCP on the server 110 and by WDS service on the server 120.

Thus, the ".dll" is registered in WDS and in DHCP service. This ".dll" serves as an intermediary, which allows the NetBoot service to receive BSDP packets from MACs. The NetBoot can respond to MACs on its own. The diagram depicted in FIG. 3 illustrates the embodiment that works without the intermediate images. In case of the intermediate images, the process is the same except for the last step. In the embodiment depicted in FIG. 3, the system boots into environment provided by Apple™. In case of the intermediate image, the system is booted into a proprietary environment, which controls the OS installation process and interacts with the SCCM.

Figure 4:
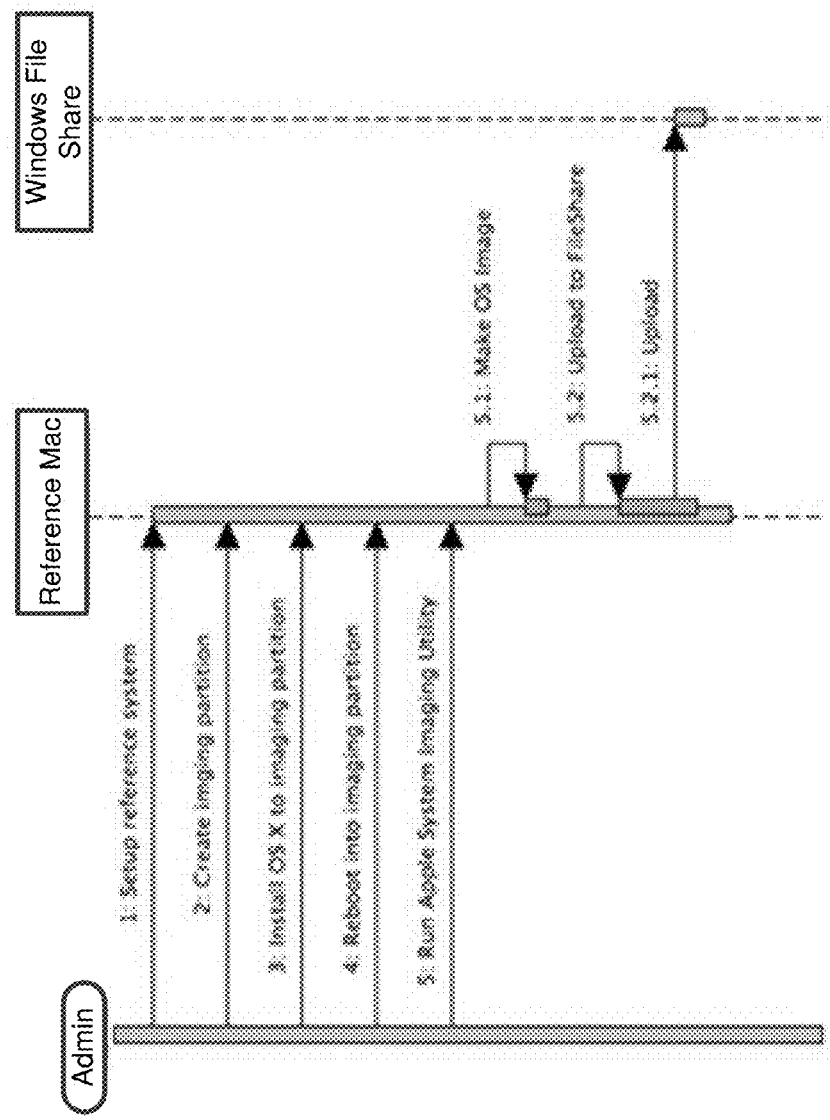
FIG. 4 illustrates a workflow of creating OS image and uploading it to a file sharing system.

FIG. 4 illustrates a workflow of creating an OS image and uploading it to file sharing system. A reference system is set up with a MAC client. The imaging partition is created and OS X is installed to the imaging partition. The client is rebooted into the imaging partition. Then, the Apple® imaging utility generates the OS image. This image is uploaded to file sharing system and then is uploaded to a non-native (i.e., Windows™) file sharing system.

Figure 5:
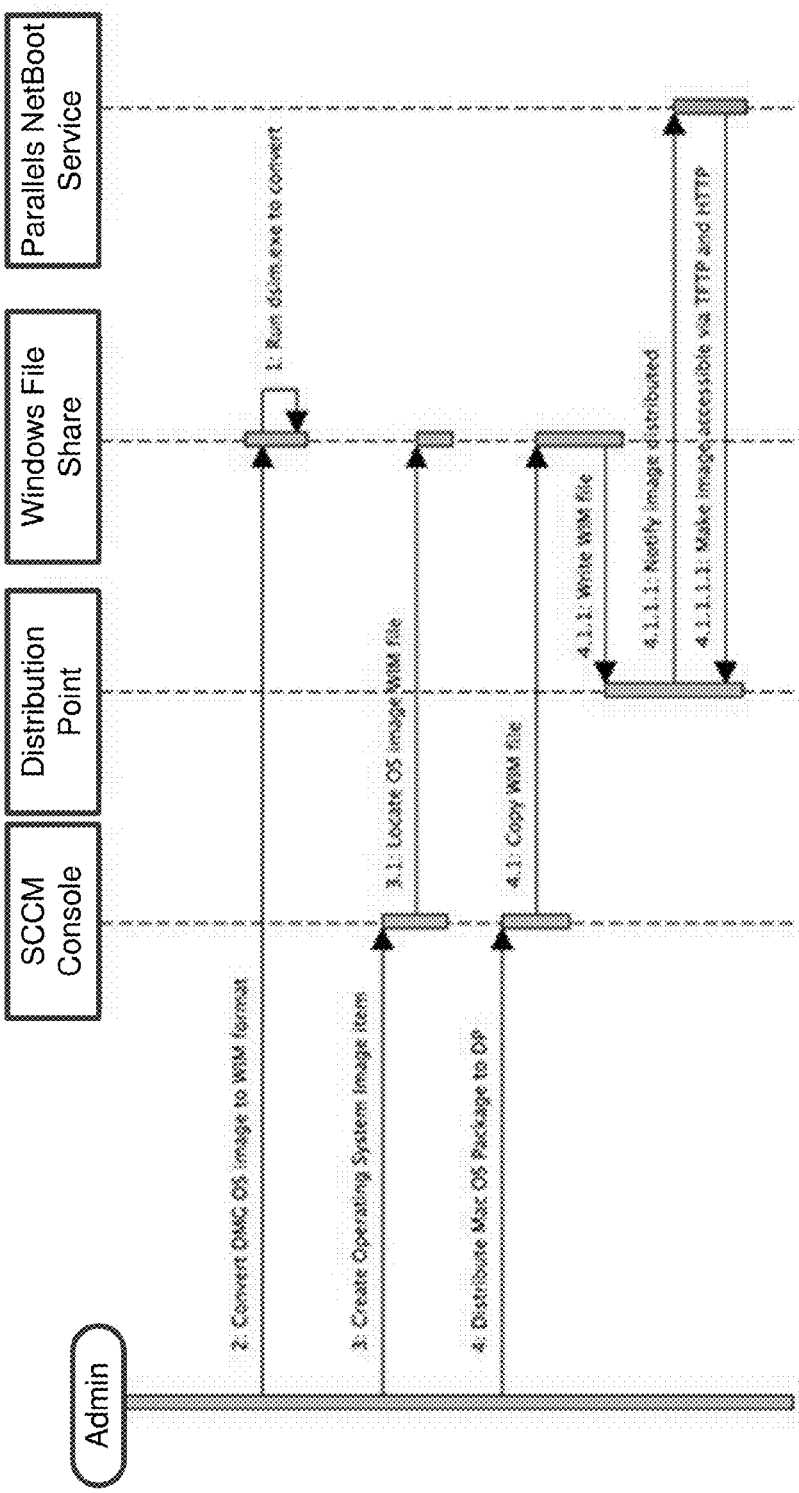
FIG. 5 illustrates an example of converting the Boot Image for deployment on a non-native client.

FIG. 5 illustrates an example of converting the Boot Image for deployment on a non-native client. The Windows file sharing system converts DMG (.dmg) OS image into WIM format by running dsim.exe. The SCCM console creates OS image item and locates OS image WIM file at the distribution point. Then, the MAC OS package is distributed to distribution point. The WIM file is copied from Windows® file sharing system and the NetBoot component is notified that the image is delivered. Then, the NetBoot makes the image accessible via Trivial File Transfer Protocol (TFTP) and via HTTP.

Figure 6:
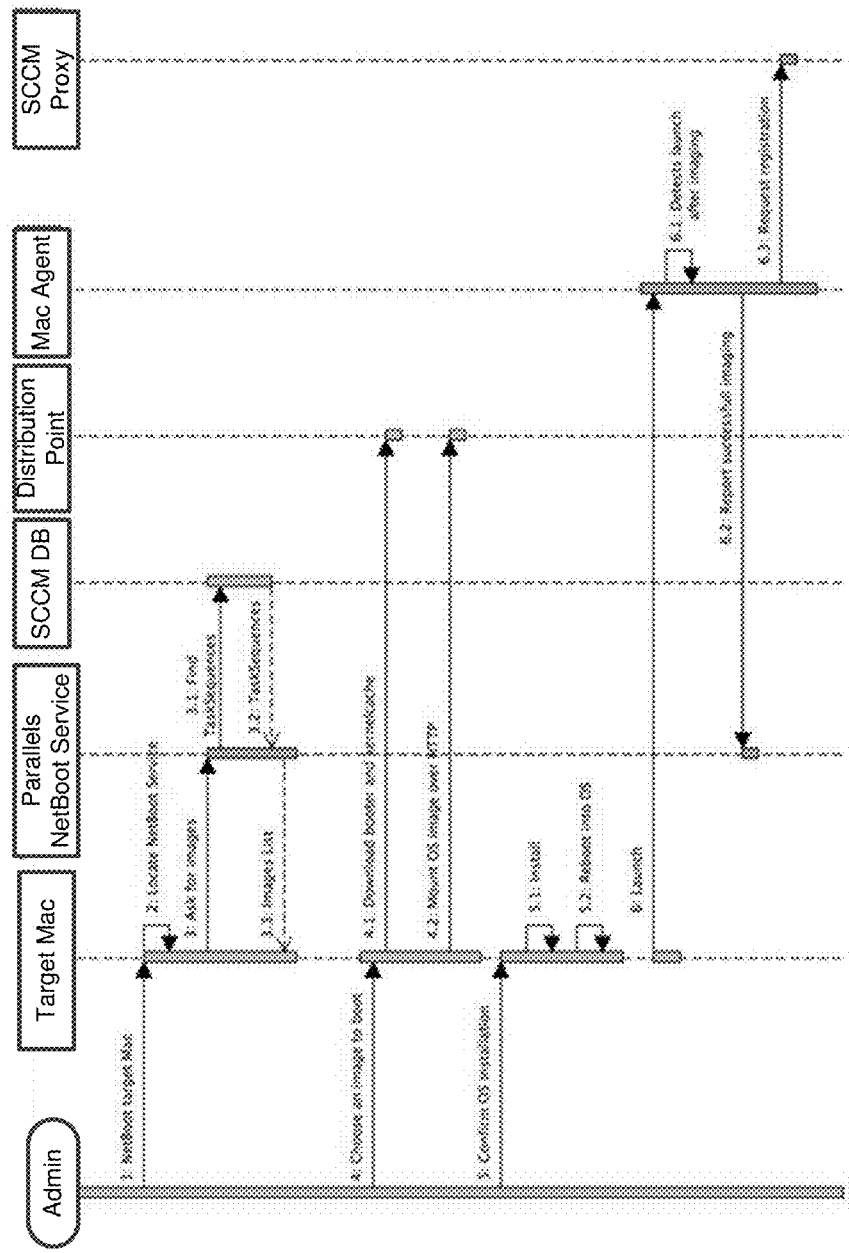
FIG. 6 illustrates a workflow of deploying the non-native client using NetBoot service.

FIG. 6 illustrates workflow of deploying the non-native client using NetBoot service, in accordance with the exemplary embodiment. The target MAC accesses the NetBoot and asks for the images. The NetBoot acquires Task Sequences from a SCCM database and provides an image list based on the Task Sequences. Once the Boot Image is selected, the booter and kernel cache are downloaded to the distribution point and the OS image is mounted over HTTP. The OS installation is confirmed, and the target MAC is rebooted into the OS and launched. The MAC agent detects the launch, reports successful imaging to the NetBoot Service and requests a registration from SCCM proxy. Note that the image is created by System Image Utility.

Figure 7:
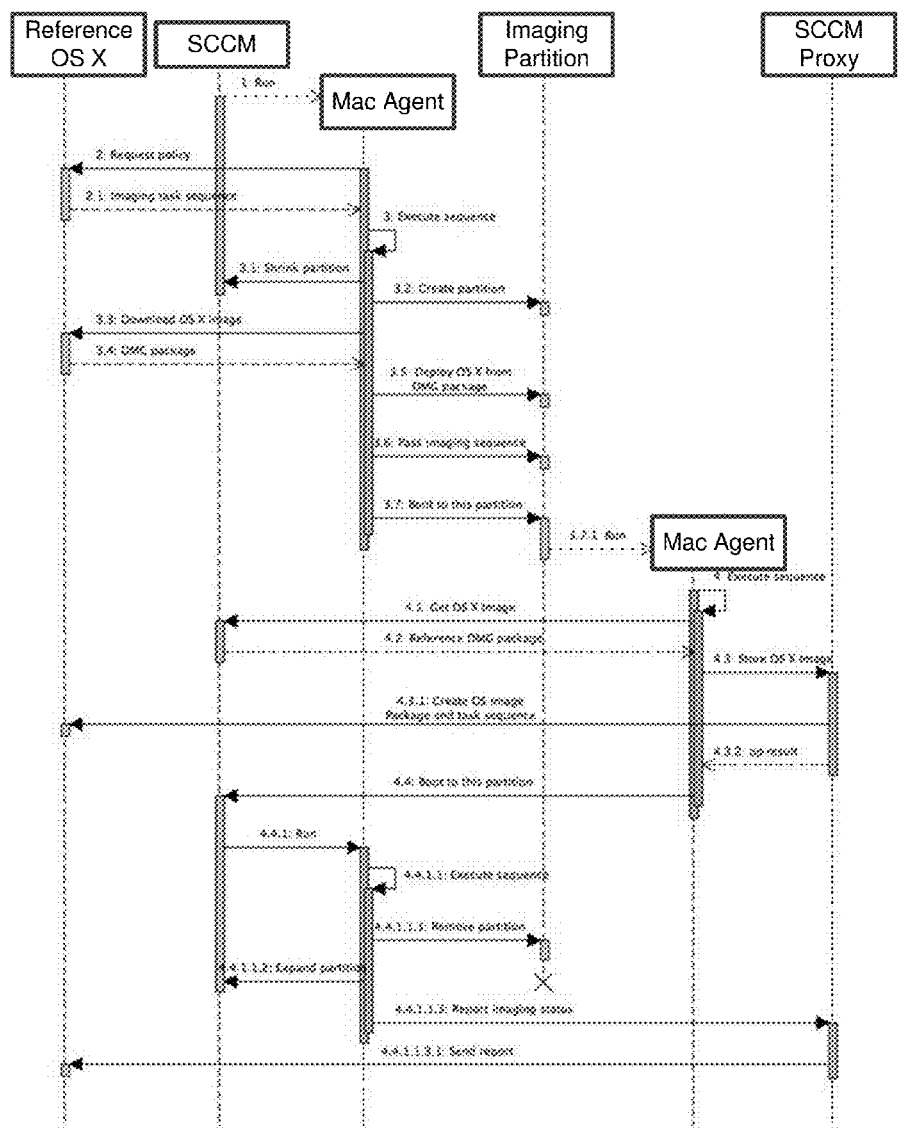
FIG. 7 illustrates workflow of deploying the non-native client using imaging partition, in accordance with the exemplary embodiment.

FIG. 7 illustrates workflow of deploying the non-native client using imaging partition, in accordance with the exemplary embodiment. The SCCM runs the MAC agent, which requests a policy from the reference OS X. The MAC agent receives and executes the imaging task sequence and shrinks the partition. Then, the MAC agent creates the imaging partition. The MAC agent downloads the OS X image which presented as a DMG package. Then, the MAC agent deploys the OS X from the DMG package to the imaging partition.

According to the exemplary embodiment, the system image is processed as follows form the moment of its creation:

1) Administrator uses System Image Utility to create the system image. A directory, such as for example, OS X Maveriks.nbi is created. This directory contains files required for loading and launch of the OS;

2) Administrator copies the directory to Windows® computer system;

3) Administrator packs the directory into ".wim" file using system utilities dsim.exe or imagex.exe;

4) Administrator places the ".wim" file on a Network Share;

5) Administrator creates in the SCCM Console an Operating System Image, indicating ".wim" as a system image;

6) Administrator distributes the Operating System Image via the SCCM Console to the server, which has NetBoot service installed;

7) The NetBoot service monitors for available Operating System Image;

8) The NetBoot service unpacks the ".wim" file and divides the content as follows:

".dmg" files to a location accessible over HTTP via IIS (Internet Information

Services) configured at the time of the NetBoot installation;

the rest of the content (booter, kernel cache, etc.) is placed by TFTP to WDS configured at the time of the NetBoot installation.

Then, the NetBoot service waits for requests from MACs.

The MAC agent passes the imaging sequences to the imaging partition and boots the target MAC client to this partition. Note that OS X image package is implemented as a container placed inside another container. The OS X image is wrapped into one container for security reasons, so the OS X setting are not changed on its way to the target MAC computer. Another container provides the format (parameters) that can be read by the SCCM. Then, the OS X is unwrapped from the containers prior to the deployment on the target computer. The System Image Utility creates OS X images as a folder with particular structure. Admin needs to wrap it into WIM file, because SCCM understands only WIM files for OS deployment (using Windows® dsim utility or by using Parallels® Extensions for SCCM Management Console). The NetBoot service unwraps WIM and puts contents to HTTP and TFTP accessible directories (Uses Windows Imaging API).

Then, the MAC agent executes the sequence and acquires the OS X image and receives a corresponding DMG package from the SCCM. The MAC agent stores the OS X image to the SCCM proxy, which creates the OS image package and the task sequence. Once the task sequence is selected, the MAC agent boots to this partition and executes the sequence. Then, the partition is expanded and stored in the SCCM. The partition is removed from the imaging partition. The report reflecting the imaging status is sent to the SCCM proxy and provided to the reference OS X.

According to the exemplary embodiment, an automated MAC Imaging Procedure is implemented according to the diagram depicted in FIG. 6. To enable the Automatic MAC Imaging, the administrator must create a special OS X image and store it as a software package in the SCCM, as follows:

Insert USB flash drive to store the image temporarily;

Reboot to System Imaging Utility;

Take system image to DMG and transfer it to the SCCM using a flash drive; and

Reboot back to the reference partition.

The administrator creates a task sequence and assigns it to a reference MAC client. This task sequence defines the imaging process to be executed by the MAC Agent. The MAC client will eventually download the appropriate policy and the task sequence.

The imaging process begins from creating a second partition (imaging partition). The MAC agent shrinks the (active) reference partition, and then it creates a (second) imaging partition on a free disk drive space. The OS X image is then downloaded from SCCM and deployed to the newly created imaging partition. The registered MAC Agent should be deployed to the imaging partition as well. When the OS X is deployed, the MAC client is rebooted to the imaging partition:

Before this happens, the currently running MAC Agent transfers the task sequence being executed along with the information regarding the already executed tasks. After a reboot, another MAC Agent in the imaging partition continues the execution of the task sequence from that point. The MAC Agent runs System Imaging Utility to acquire the OS X image from the reference partition. The created OS image is pushed to the Windows file sharing system, and then the SCCM Proxy is asked to create an OS Image package and a task sequence in the SCCM for this package. When the OS image is placed into the SCCM, the MAC Agent reboots back to the reference partition and performs some cleanup: the imaging partition is removed and the reference partition is expanded to its initial size. When the imaging process is completed, the report is sent to the SCCM.

Figure 8:
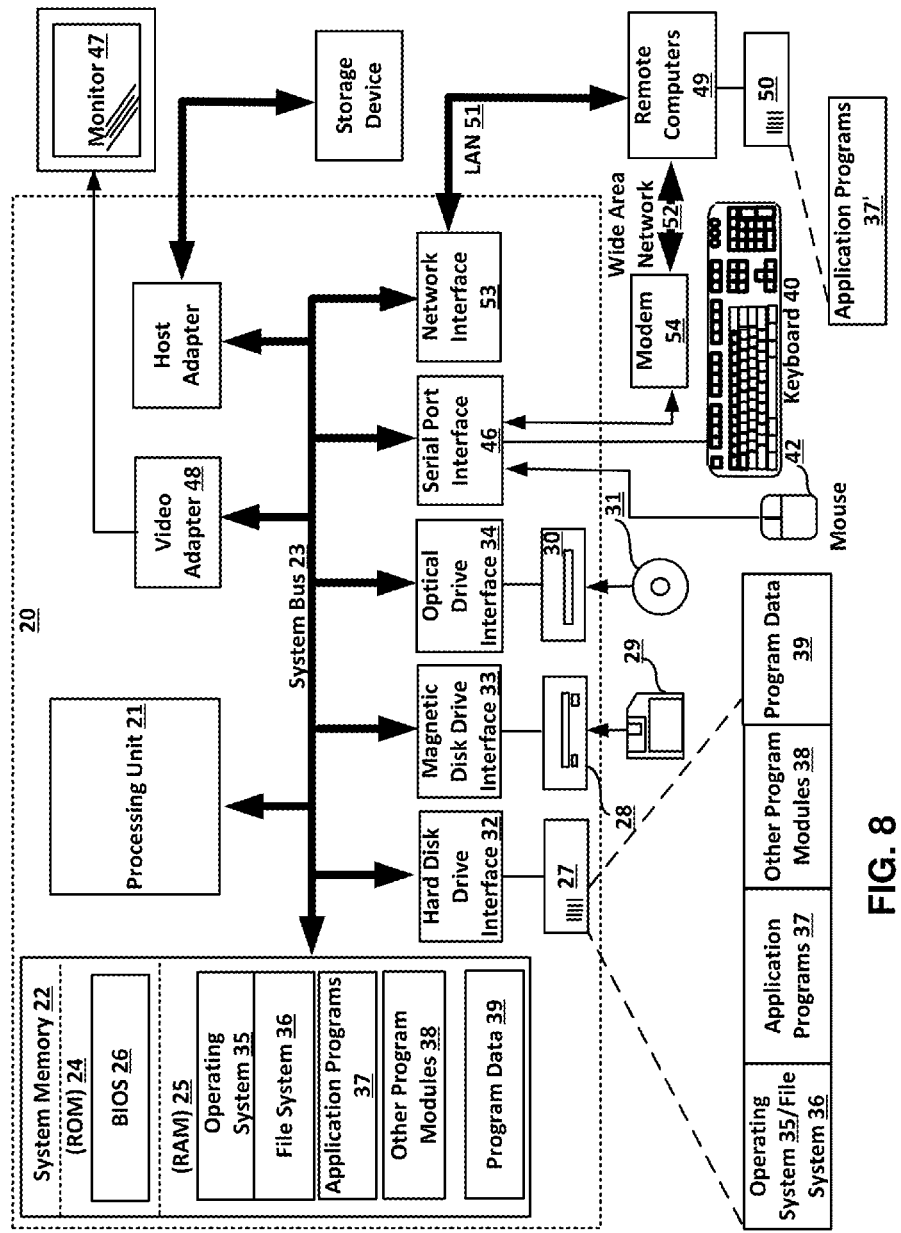
FIG. 8 illustrates a schematic of an exemplary computer system that can be used for implementation of the invention.

With reference to FIG. 8, an exemplary system for implementing the invention includes a general purpose computing device in the form of a computer system 20 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A computer-implemented method for deploying a native operating system on a host using a non-native server, the method comprising:
    installing a network booting component on the non-native server;
    storing an operating system (OS) image in a format of the non-native server on the network booting component;
    converting the OS image from the format of the non-native server to a format of a target host, wherein the format of the non-native server is incompatible with the format of the target host;
    accessing the network booting component and requesting the OS image for the target host;
    acquiring a task sequence from a non-native server database, including acquiring OS versions and configurations available for user selection;
    providing an image list to the target host based on the task sequence;
    receiving image selection;
    loading a booter and a kernel cache to a distribution point of the non-native server;
    booting the target host into an intermediate environment;
    mounting an OS; and
    rebooting the target host into the OS,
    wherein the OS image is converted from a DMG format into a WIM format and de-converted back to the DMG format prior to deployment on the target host.

2. The method of claim 1, further comprising mounting the OS over HTTP.

3. The method of claim 1, further comprising detecting a launch of the target host by a native host agent and reporting it to the network booting component.

4. The method of claim 3, further comprising requesting a registration of the native host agent by the non-native server.

5. The method of claim 1, further comprising converting the OS image into a non-native format for packaging it and sending the OS image to a non-native distribution point.

6. The method of claim 5, further comprising de-converting OS image into a native format of the target host prior to deploying it on the target host.

7. The method of claim 1, wherein the non-native server includes a System Center Configuration Manager infrastructure.

8. The method of claim 1, wherein the OS image is converted from DMG format into WIM format prior to storing it on the server.

9. The method of claim 1, further comprising:
    creating an intermediate boot image and launching the target host;
    invoking a user interface configured to render available OSs to a user;
    detecting an OS selected by the user; and
    reloading the target host into the selected OS.

10. The method of claim 9, wherein the target host is deployed based on parameters defined by the task sequence.

11. The method of claim 10, wherein the task sequence is configured by an administrator.

12. The method of claim 11, wherein the task sequence is a System Center Configuration Manager task sequence.

13. The method of claim 1, wherein the requesting of the OS image is performed using a Windows Distribution Service plug-in.

14. The method of claim 1, wherein the requesting of the OS image is performed using a Dynamic Host Control Protocol Service plug-in.

15. The method of claim 1, further comprising encapsulating the OS image into a container for keeping the integrity of the image.

16. The method of claim 15, further comprising placing the container inside another container providing a format complying with the System Center Configuration Manager.

17. A system for deploying a native operating system using a non-native server, the system comprising:
- a non-native distribution point server running a native network booting component;
- a target host connected to the non-native distribution point server;
- a non-native site server configured to run a System Center Configuration Manager proxy, wherein:
- an operating system (OS) image stored in a native format on the native network booting component;
- the native target host is configured to access the native network booting component and request the OS image;
- the network booting component is configured to acquire a task sequence from a non-native server System Center Configuration Manager database, including acquiring OS versions and configurations available for user selection, and to convert the OS image from the format of the non-native site server to a format of the native target host, wherein the format of the non-native site server is incompatible with the format of the native target host;
- the network booting component is configured to provide an image list to the target host based on the task sequence;
- the distribution point server is configured to load a booter and a kernel cache to an entry point of the non-native site server;
- the distribution point server is configured to boot the target host into an intermediate environment; and
- the distribution point server is configured to mount the OS over HTTP,
- wherein the OS image is converted from a DMG format into a WIM format and de-converted back to the DMG format prior to deployment on the target host.

18. The system of claim 17, wherein the System Center Configuration Manager is configured to convert the OS image into a native format.

19. The system of claim 17, wherein OS registration information is provided from the target host to the System Center Configuration Manager proxy.

* * * * *